Nov. 16, 1926.  
P. ZAKRZEWSKY  
1,607,382  
LAWN MOWER  
Filed Sept. 11, 1922   2 Sheets-Sheet 2

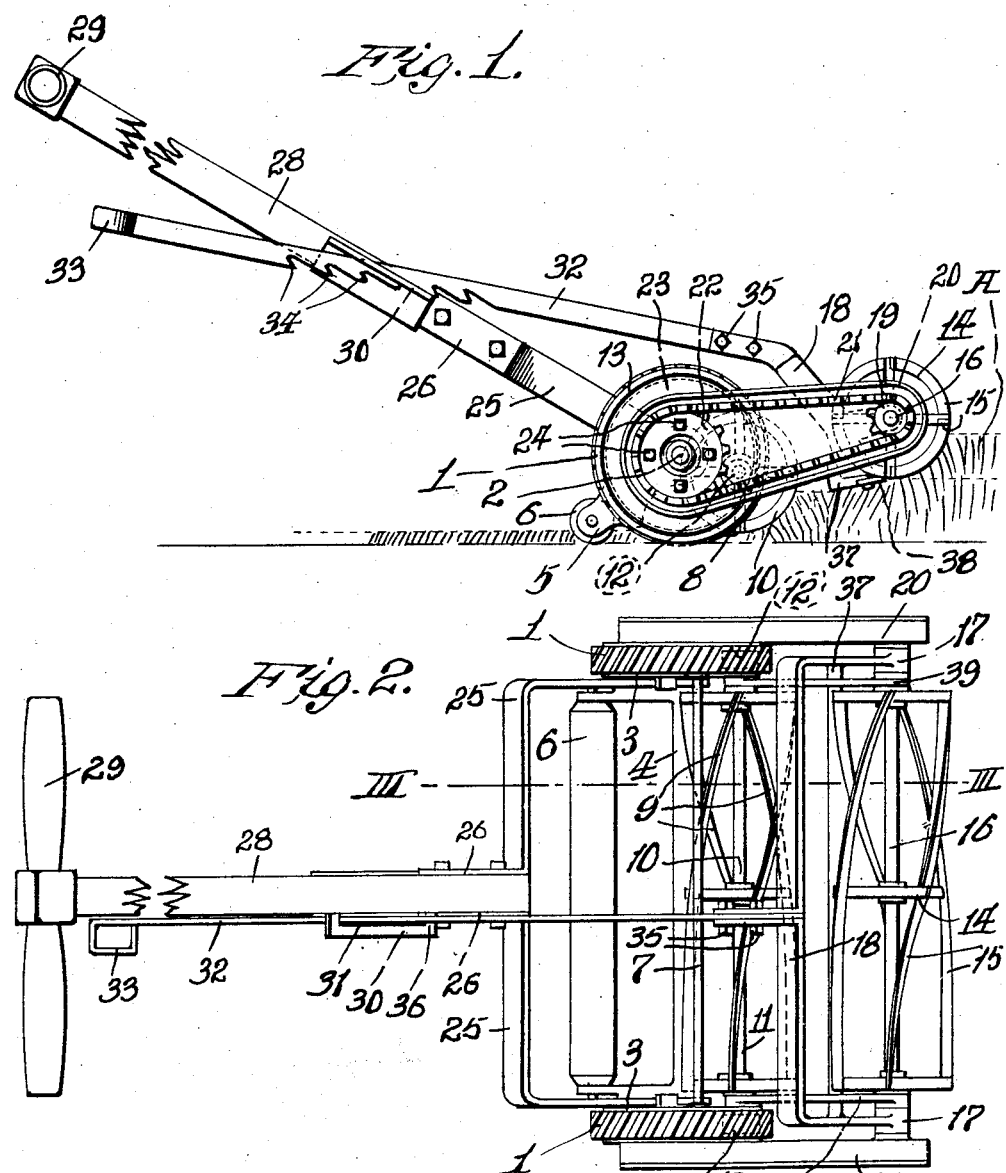

Inventor:
Peter Zakrzewsky.
By H. G. Fletcher
atty.

Patented Nov. 16, 1926.

1,607,382

UNITED STATES PATENT OFFICE.

PETER ZAKRZEWSKY, OF ST. LOUIS, MISSOURI.

LAWN MOWER.

Application filed September 11, 1922. Serial No. 587,364.

This invention relates to an improvement in lawn mowers and has for its primary object the purpose of providing auxiliary grass cutting means.

Another object of the invention is to provide a lawn mower with a pair of grass cutting devices, one of which is set a distance forwardly of and on a plane above the other device.

A further object of the invention is to provide a lawn mower with two sets of grass cutting blades, one set of blades being adjustable relative to the other set for the purpose of preceding said other set and making a cutting on grass or the like which has grown too long for the proper cutting of said other blade set.

Other and further objects will appear in the specification and be specifically pointed out in the appended claims, reference being had to the accompanying drawings, exemplifying the invention, and in which:—

Figure 1 is a side elevation of a lawn mower showing this improved attachment applied thereto.

Figure 2 is a plan view of Fig. 1.

Figure 3:
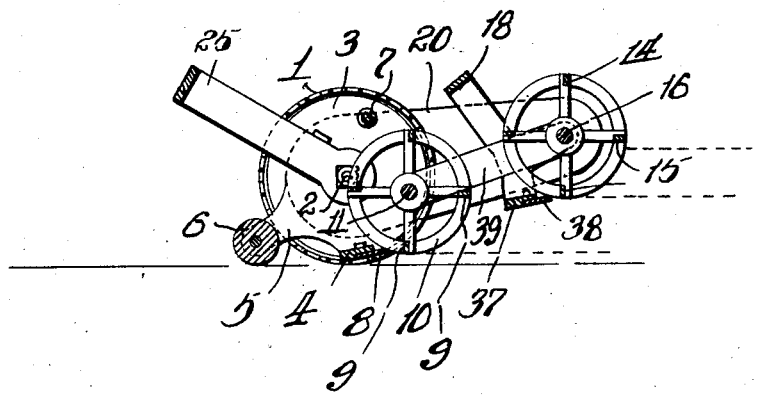
Figure 3 is a longitudinal section taken approximately on the line III—III of Fig. 2.

Referring by numerals to the accompanying drawings, this improved lawn mower is provided with a pair of spaced tractor wheels 1 each being supported upon a respective pivot 2 from a respective side member 3 of a frame 4, said frame having a pair of rearwardly extending ears 5 between which is mounted a ground engaging roller 6.

A rod 7 is also provided for assisting in tying the side members 3 together, and carried forwardly of the frame 4 is a cutting plate 8 and co-operable with the cutting edge of said plate are a plurality of blades 9 of a rotary grass cutter 10, said cutter 10 being supported on a horizontally extending shaft 11, the ends of which extend respectively within a side member 3, and mounted on each end of said shaft is a pinion 12, each pinion meshing with the interior teeth 13 of a respective tractor wheel 1.

The aforesaid construction may comprise the usual type of lawnmower, said construction however, or one similar to it being required in connection with this improvement which may be in the form of an attachment to a standard lawn mower.

This improved lawn mower is comprised of a rotary grass cutter 14 which is mounted forwardly and above the cutter 10, said cutter 14 being provided with a plurality of blades 15 which are supported from a horizontally arranged shaft 16, said shaft being supported at each end in a bearing 17, said bearings forming part of a yoke 18. Rigidly secured on each end of the shaft 16 is a sprocket 19, each sprocket being located in a housing 20, and mounted over each sprocket is an endless chain-belt 21, each of said belts being respectively mounted over a sprocket 22, each sprocket 22 being secured to the web 23 of a respective tractor wheel 1 by cap-screws 24, said sprocket wheels 22 and chain-belts 21 also being located within respective housings 20.

Mounted on each tractor wheel pivot 2 is a member 25 each being of an angular shape and provided with an extension 26, and mounted between said extensions is a handle or tongue 28 bearing a hand bar 29, and secured to said tongue is a guiding plate 30 bearing a slot 31 and slidable within said slot is an adjusting bar 32 having a hand gripping portion 33, said bar 32 having a series of teeth 34 formed on its lower edge.

The forward end of the adjusting bar 32 is secured at 35 to the yoke 18, the teeth 34 of said bar being adapted to engage with the portion 36 of the guiding plate 30 which is provided by the slot 31, and carried by the yoke 18 is a cross member 37 for the support of a cutting plate 38, said cutting plate cooperating with the blades 15 of the rotary cutter 14.

The main theme of this invention is to provide a lawn mower with an attachment for cutting grass and the like which has grown too long to be cut by an ordinary lawn mower, and in the operation of this improved device in long grass, the tractor wheels 1 upon being rotated by the propelling force given to the tongue 28 of the lawn mower, said wheels will cause the respective sprockets 22 carried thereby to revolve thereby imparting motion to the sprockets 9 of the shaft 16 of the rotary cutter 14 by the travel of the chain-belts 21, said cutter 14 engaging the tall or long grass, designated as A and forcing the upper portions of the long grass between the blades 15 and the cutting plate 38, said cutter 14 leveling the grass to a height at which it can be properly attacked and cut by the rotary cutter 10 which is operated simultaneously with the rotary cutter 14 by the pinions 12 which mesh with the interior teeth 13 of the tractor wheels 1.

The adjustable bar 32 which is secured to the yoke 18 provides for elevating or lowering the rotary cutter 14, as the yoke 18 is extended from the shaft 16 of said cutter 14 and a rearwardly pulling force given to the bar 32 will serve to elevate the cutter 14, whereas, if the bar 32 is pushed forwardly the cutter 14 is lowered, the teeth 34 provided on said bar co-operating with the plate 30 for holding the cutter 14 in a desired and adjusted position.

The shafts 11 and 16 of the respective cutters 10 and 14 are tied together by a pair of radius members 39.

Figure 4:
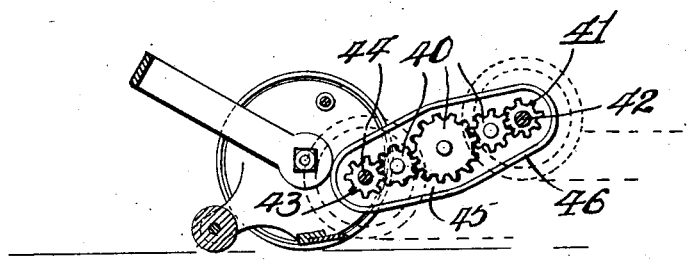
Figure 4 is a longitudinal section showing a modification of the gearing which may be used between the two sets of grass cutting devices.

Referring to the embodiment disclosed in Fig. 4 in which a train of gearing 40 is used on each side of the lawn mower between respective pinions 41 of the upper arranged cutter shaft 42 to the respective pinions 43 of the lower arranged cutter shaft 44, said manner of gearing being used instead of the chain drive disclosed in Figs. 1 and 2. In this instance the side plates 45 of the gear housing 46 will serve as radius members.

What I claim is:—

1. A lawn mower provided with a pair of grass cutting devices each having a shaft, one of said devices being located forwardly of the other device, swingable means for the support of said forward device supported from the shaft of the rearward device, and means extending to a position in proximity to the operator of the mower for raising and lowering said swingable means.

2. A lawn mower provided with a pair of grass cutting devices and a pushing tongue, a hand bar for said tongue, one of said devices being swingably mounted from said other device and located forwardly thereof, a pulling yoke connected to said forward device for adjusting it, a bar extending from said yoke to a position in proximity to the hand bar of said pushing tongue, and driving means co-operable with said devices.

3. A lawn mower provided with a pair of grass cutting devices, means swingable from one of the devices for supporting the other device forwardly thereof, a pushing handle for propelling the mower, a guiding plate secured to said handle, and adjustable means extending from said swingable means located parallel to said handle in proximity thereto, said adjustable means having teeth for engagement with a portion of said plate.

PETER ZAKRZEWSKY.